US006888692B2

(12) United States Patent
Smith

(10) Patent No.: US 6,888,692 B2
(45) Date of Patent: May 3, 2005

(54) METHOD AND APPARATUS FOR IMPLEMENTING INTELLIGENT SPIN-UP FOR A DISK DRIVE

(75) Inventor: Gordon James Smith, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 404 days.

(21) Appl. No.: 10/066,861

(22) Filed: Feb. 4, 2002

(65) Prior Publication Data

US 2003/0147169 A1 Aug. 7, 2003

(51) Int. Cl.[7] ............................ G11B 15/18; G11B 15/46
(52) U.S. Cl. ........................ 360/71; 360/69; 360/73.01
(58) Field of Search ........................ 360/69, 71, 73.01; 711/114, 111, 112; 714/42; 713/350, 340; 318/568; 324/224

(56) References Cited

U.S. PATENT DOCUMENTS

| | | | | |
|---|---|---|---|---|
| 5,729,552 A | * | 3/1998 | Yorimitsu | ................... 714/718 |
| 5,915,122 A | * | 6/1999 | Tsurumi | ..................... 713/330 |
| 6,192,481 B1 | * | 2/2001 | Deenadhayalan et al. | ... 713/324 |
| 6,233,693 B1 | * | 5/2001 | Berglund et al. | ........... 713/340 |

* cited by examiner

*Primary Examiner*—Sinh Tran
*Assistant Examiner*—K. Wong
(74) *Attorney, Agent, or Firm*—Joan Pennington

(57) ABSTRACT

A method and apparatus are provided for implementing intelligent spin-up for a disk drive. When a command is received, checking for a disk drive start command is performed. Responsive to identifying the disk drive start command, a no-start flag is checked. Responsive to identifying the no-start flag being set, an error code is returned without starting the disk drive. The disk drive is started only when the no-start flag is not set. During operation of the disk drive, the disk drive is monitored to identify a drive fault condition. Responsive to identifying a disk drive fault, the identified disk drive fault is checked to identify a predefined inoperative drive or dead device fault. When a predefined dead device fault is identified, the no-start flag is set and an error code for the predefined dead device fault is stored. Also a no-load flag is set that is used when the disk drive is running to stop the disk drive and return an error code before the transducer heads are loaded.

13 Claims, 4 Drawing Sheets

METHOD AND APPARATUS FOR IMPLEMENTING INTELLIGENT SPIN-UP FOR A DISK DRIVE

FIELD OF THE INVENTION

The present invention relates generally to the data processing field, and more particularly, relates to a method and apparatus for implementing intelligent spin-up for a disk drive.

DESCRIPTION OF THE RELATED ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the disk axis of rotation write data to the disks and read data from the disks. Data located on a particular track on a disk surface is read or written by properly positioning a data transducer head directly over the track. In order to maintain the head in proper position over the data track, servo systems typically are incorporated into disk drives.

During operation, a conventional disk drive can be rendered inoperable as a result of various different conditions. For example, a head crash often renders a conventional disk drive inoperable. One of the reasons for magnetic recording heads crashing of a disk surface, for example, causing catastrophic failure is the presence of protruding disk defects or asperities. Large surface bumps are notorious for causing physical head-to-disk contact, which is the precursor for a fatal disk crash. Another cause for head crashes is the accumulation of contamination debris on a head which causes low flying height.

A study of system errors logs from known disk drives has revealed that crashed drives are repeatedly started, sometimes for days, with the resulting unit error code the same each time. A survey of known disk drives has revealed that many crashed drives had an average of 20 repetitions of the same unit error code each day for up to a week. Sometimes a drive exhibiting a problem is switched to a new slot where the change of location is provided in an attempt to fix the disk drive's problem. In the case of a crashed drive, switching the drive to a new location is a waste of time. Once a fatal disk drive fault has occurred, the dead disk drive must be replaced or repaired.

It is desirable to effectively identify critical fatal conditions in a disk drive. A need exists for a mechanism to address such critical fatal conditions in the disk drive. A need exists for a mechanism to avoid starting and/or attempting to start an inoperative or dead disk drive.

SUMMARY OF THE INVENTION

A principal object of the present invention is to provide a method and apparatus for implementing intelligent spin-up for a disk drive. Other important objects of the present invention are to provide such method and apparatus for implementing intelligent spin-up for a disk drive substantially without negative effect and that overcome many of the disadvantages of prior art arrangements.

In brief, a method and apparatus are provided for implementing intelligent spin-up for a disk drive. When a command is received, checking for a disk drive start command is performed. Responsive to identifying the disk drive start command, a no-start flag is checked. Responsive to identifying the no-start flag being set, an error code is returned without starting the disk drive.

In accordance with features of the invention, the disk drive is started only when the no-start flag is not set. During operation of the disk drive, the disk drive is monitored to identify a drive fault condition. Responsive to identifying a disk drive fault, the identified disk drive fault is checked to identify a predefined inoperative drive or dead device fault. When a predefined dead device fault is identified, the no-start flag is set and an error code for the predefined dead device fault is stored. Also a no-load flag is set that is used when the disk drive is running to stop the disk drive and return an error code before the transducer heads are loaded.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
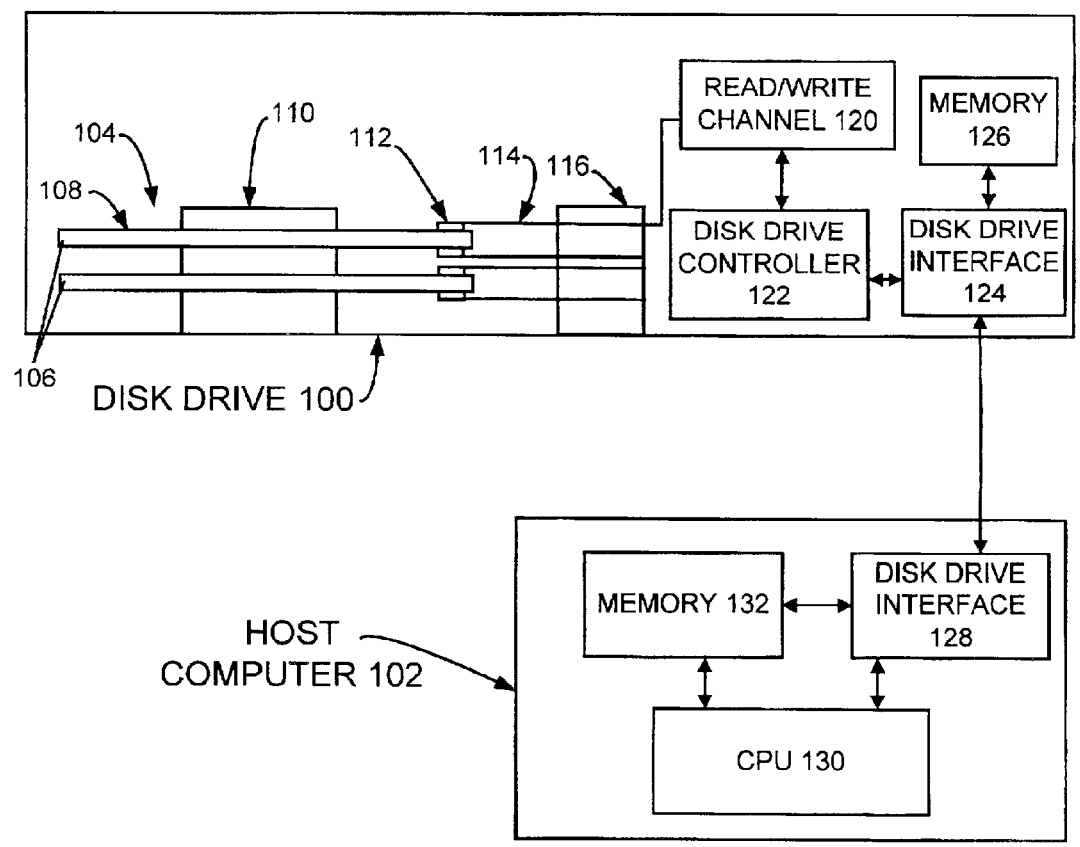
FIG. 1 is a schematic and block diagram representation illustrating a direct access storage device (DASD) for implementing methods for intelligent spin-up for a disk drive in accordance with the preferred embodiment.

Having reference now to the drawings, in FIG. 1 there is illustrated a direct access data storage device (DASD) or disk drive generally designated as 100 together with a host computer generally designated as 102 for implementing intelligent spin-up for disk drive 100 in accordance with the preferred embodiment. As shown in FIG. 1, disk drive 100 includes a stack 104 of disks 106 each having at least one magnetic surface 108. The disks 106 are mounted parallel to one another for simultaneous rotation on and by an integrated spindle and motor assembly 110. Information on each magnetic disk surface 108 is read from or written to the disk surface 108 by a corresponding transducer head assembly 112 movable in a path having a radial component across the rotating disk surface 108.

An arm 114 carries each transducer head assembly 112. The arms 114 are ganged together for simultaneous pivotal movement by a voice coil motor (VCM) magnet assembly or actuator 116. Drive signals applied to the VCM magnet assembly 116 cause the arms 114 to move in unison to position the transducer head assemblies 112 in registration with information storage tracks on the disk surfaces 108 where information is written or read.

Disk drive 100 includes a read/write channel 120 coupled to the transducer head assemblies 112 and coupled to a disk drive controller 122 that generates signals controlling the operation of various components of the disk drive 100. Disk drive 100 includes a disk drive interface 124 coupled to the disk drive controller 122 and a memory 126. Disk drive interface 124 is connected to a disk drive interface 128 of the host computer 102. Host computer 102 includes a central processing unit (CPU) 130 and a memory 132 coupled to the disk drive interface 128. Host computer 102 provides data read and write commands to the disk drive, and data signals are transmitted to or from the transducer head assemblies 112.

Figure 2:
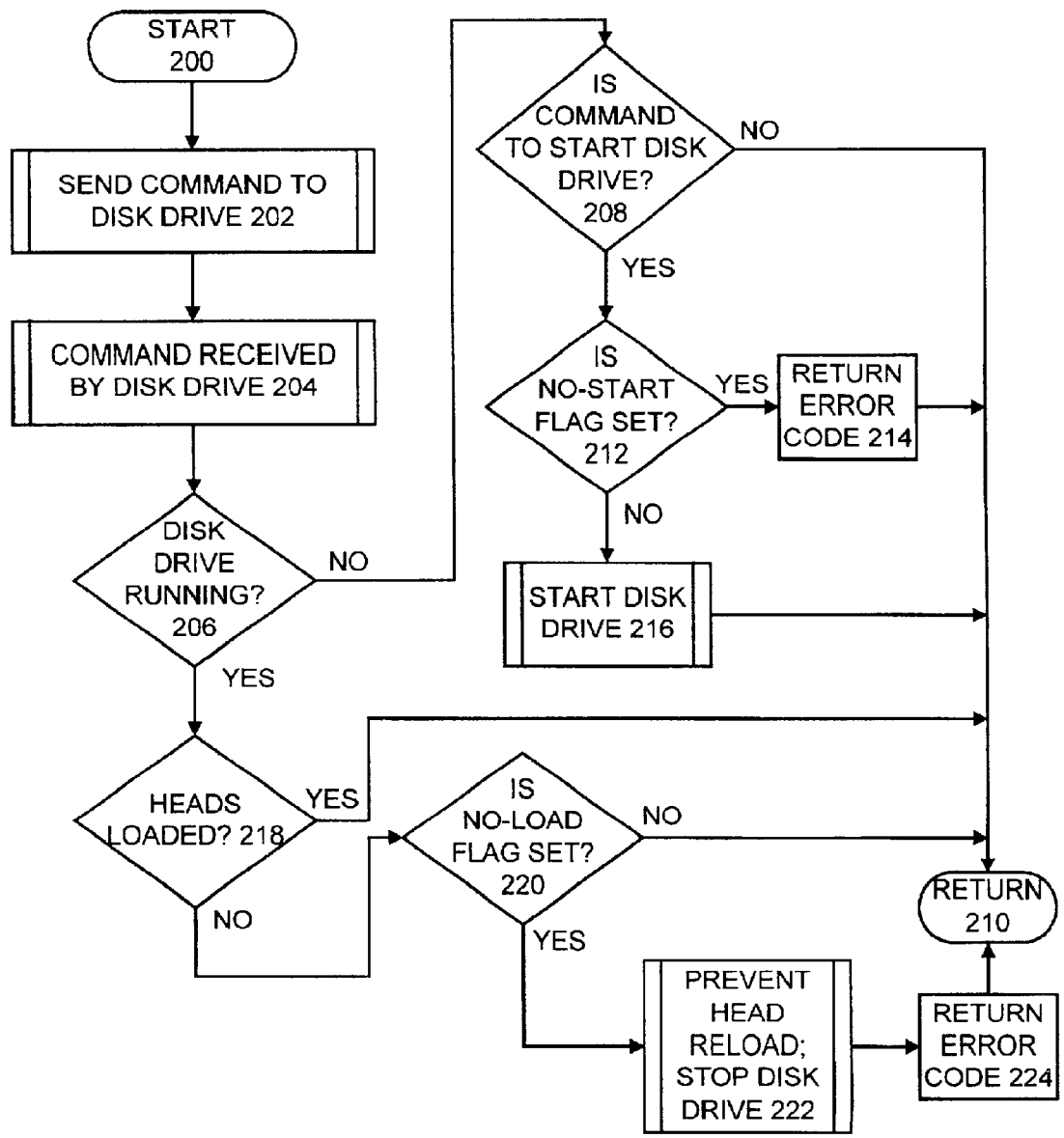
FIGS. 2 and 3 are flow charts illustrating exemplary sequential steps for implementing intelligent spin-up for a disk drive in accordance with the preferred embodiment.
Figure 3:
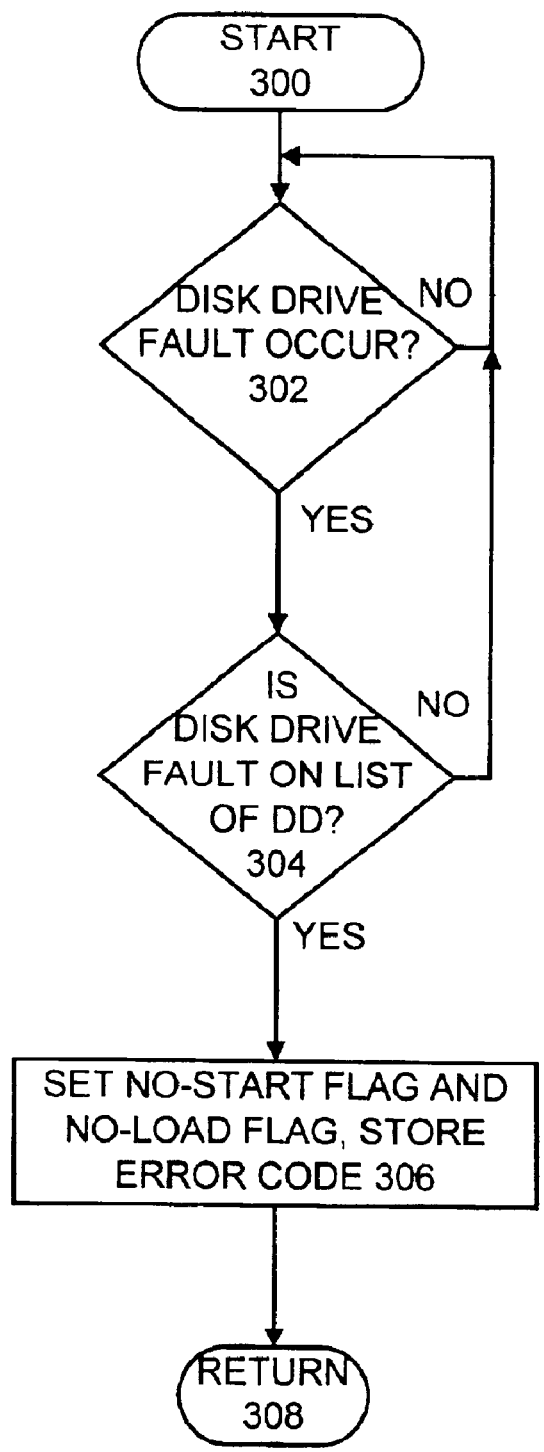

Disk drive controller 122 is suitably programmed for implementing intelligent spin-up for the disk drive 100 to execute the flow functions of the preferred embodiment as illustrated in FIGS. 2 and 3.

In accordance with features of the preferred embodiment, the disk drive 100 identifies inoperative or dead disk drive conditions. Known errors result when a drive has crashed. The disk drive 100 stores a plurality of errors, such as unit error codes (UECs) corresponding to inoperative or dead disk drive conditions. For example, a master list of device dead (DD) UECs can be stored in internal memory of the disk drive controller 122 in the drive 100.

In accordance with features of the preferred embodiment, when one of the DD UECs occurs, a no-start flag is set so that when a next unit start command is sent to the disk drive 100, the disk drive does not try to start. Rather the disk drive 100 returns the failing UEC or a specific UEC that tells the host computer 102 that the disk drive is inoperative. When the disk drive 100 receives a start command after identifying an inoperative drive condition, the disk drive 100 does not start the motor assemblies 110 and 116. One of the stored DD unit error codes (UECs) is returned to the host computer 102 when the disk drive 100 has crashed.

In accordance with features of the preferred embodiment, a no-load flag also is set when one of the DD UECs occurs. When a command is received and the disk drive is already running, the no-load flag is used so that the heads will not be loaded and the disk drive will be stopped. Then the disk drive 100 returns the failing UEC to inform the host computer 102 that the disk drive is inoperative.

It should be understood that the disk drive 100 can require any particular one of the DD UECs to occur a set number of times before a no-start flag is set. For example, when DD UECs occur corresponding to certain failure conditions, one or more retries may be attempted to verify that the UEC is repeatable. However, typically no more than one retry should be performed. After the particular DD UEC occurs the set number of times, then the disk drive 100 will not start the motor when commanded to start in the future.

There are two important benefits of the invention. First, the disk drive 100 that has crashed is left in a state that can enable effective failure analysis. Currently, drives are started many times after they have crashed resulting in a massive head crash with many more heads crashed than there were originally. When analyzing failures, it is important to get at the root cause. By not exacerbating the head crash situation, the invention leaves a crashed drive in a state from which the root cause for a head crash is more likely to be determined. A second reason for using the invention is for improved disk drive performance. If a drive has crashed, it is senseless to waste time waiting for the disk drive to become ready for normal operation, such as writing and reading data. In accordance with the invention, an immediate response is provided from the drive that it has crashed.

The following are examples UECs for one known disk drive that can occur when the disk drive has a head crash.

UEC 0x0271: Servo error—unable to orient sector after breaking free of latch—(80% of drives that have crashed return this UEC)

UEC 0x0265: Servo error—three consecutive bad SIDs (seeking)—(8% of drives that have crashed return this UEC)

UECs 0x028B, 0x025F, 0x0273: Servo errors—(12% of drives that have crashed return this UEC)

From the above list it may be understood that using only one DD UEC=0x0271 would typically cover about 80% of the crashed drives.

It should be understood that head crashes have been given here as one example. Other drive conditions include, for example, the motor assembly 126 is damaged, such as shorted, open, damaged bearings, and the like. Other drive conditions include, for example, a write or read head is damaged open, shorted, and the like. The invention can cover any drive fault for which the time to recognize the fault is significantly reduced over current methods.

Referring now FIG. 2, there are shown exemplary sequential steps for implementing intelligent spin-up for a disk drive in accordance with the preferred embodiment starting at a block 200. A command is sent by the host computer to the disk drive 100 as indicated in a block 202. The command is received by the disk drive 100 as indicated in a block 204. Then the disk drive controller 122 checks whether the disk drive is running as indicated in a decision block 206. If the disk drive is not running, then checking whether the command is to start the disk drive is performed as indicated in a decision block 208. If not, then the sequential operations return as indicated in a block 210.

Otherwise when the command is to start the disk drive at decision block 208, the disk drive controller 122 as indicated in a decision block 212 performs checking for the no-start flag being set. The no-start flag is set as illustrated and described with respect to FIG. 3. When the no-start flag is set, the disk drive controller 122 returns an error code as indicated in a block 214. Then the sequential operations return as indicated at block 210. The disk drive controller 122 starts the disk drive as indicated in a block 216 only if the no-start flag is not set. Then the sequential operations return as indicated at block 210.

When the disk drive controller 122 finds that the disk drive is running at decision block 206, then the disk drive controller 122 checks whether the transducer heads are loaded as indicated in a decision block 218. When the transducer heads are already loaded, then the sequential operations return as indicated at block 210. When the transducer heads are not loaded, then the disk drive controller 122 as indicated in a decision block 220 performs checking for the no-load flag being set. The no-load flag is set as illustrated and described with respect to FIG. 3. When the no-load flag is set, the disk drive controller 122 prevents head reloading and stops the disk drive as indicated in a block 222. If a disk drive experiences a UEC on the DD list, the heads 112 may simply unload and the disks left spinning. The unload flag being set prevents the heads from reloading. Then the disk drive controller 122 returns an error code that was stored with setting the no-load flag as indicated in a block 224. Then the sequential operations return as indicated at block 210.

Referring now FIG. 3, there are shown exemplary sequential steps for implementing intelligent spin-up for a disk drive in accordance with the preferred embodiment starting at a block 300. During the operation of the disk drive 100 after being started at block 216 in FIG. 2, the disk drive controller 122 monitors the disk drive 100 and checks for a disk drive fault as indicated in a decision block 302. When a disk drive fault is not identified, then monitoring of the disk drive 100 continues at decision block 302.

When a disk drive fault is identified, then the disk drive controller 122 as indicated in a decision block 304 checks if the identified disk drive fault is on the list of DD unit error codes (UECs). When the identified disk drive fault is not on the list of DD unit error codes (UECs), then monitoring continues at decision block 302.

When the identified disk drive fault is on the list of DD unit error codes (UECs), then the no-start flag and the no-load flag are set and an error code for the identified disk drive fault is stored as indicated in a block 306. Then the sequential operations return as indicated in a block 308.

Figure 4:
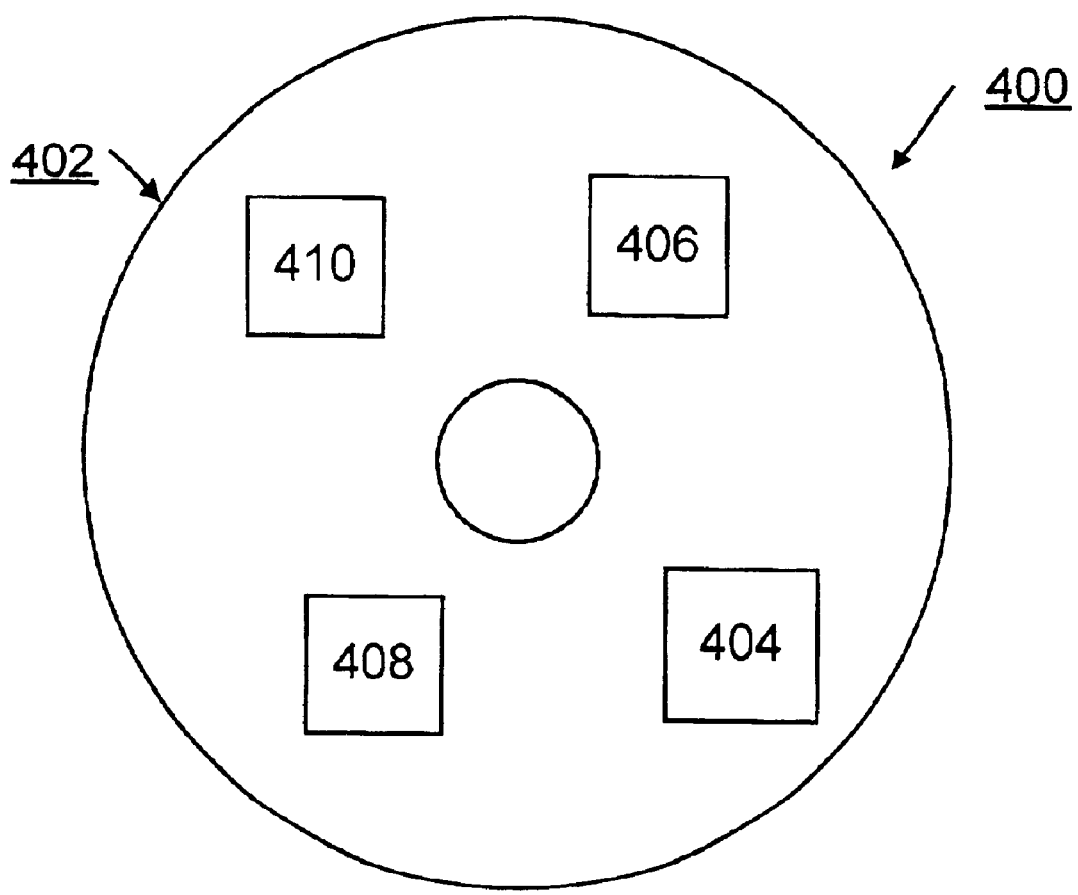
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing intelligent spin-up of the preferred embodiment in the system 100 of FIG. 1.

A sequence of program instructions or a logical assembly of one or more interrelated modules defined by the recorded program means 404, 406, 408, 410, direct the disk drive 100 for implementing intelligent spin-up of the preferred embodiment.

While the present invention has been described with reference to the details of the embodiments of the invention shown in the drawing, these details are not intended to limit the scope of the invention as claimed in the appended claims.

What is claimed is:

1. A method for implementing intelligent spin-up for a disk drive comprising the steps of:
receiving a command;
checking for a disk drive start command;
responsive to identifying said disk drive start command, checking a no-start flag;
responsive to identifying said no-start flag being set, returning an error code without starting said disk; and
identifying a predefined dead device fault, setting said no-start flag, and storing said error code.

2. A method for implementing intelligent spin-up for a disk drive as recited in claim 1 includes the step of starting said disk drive only responsive to identifying said no-start flag not being set.

3. A method for implementing intelligent spin-up for a disk drive as recited in claim 2 includes the steps of monitoring said disk drive to identify a disk drive fault.

4. A method for implementing intelligent spin-up for a disk drive as recited in claim 3 includes the step responsive to identifying said disk drive fault, of checking whether said identified disk drive fault is said predefined dead device fault.

5. A method for implementing intelligent spin-up for a disk drive as recited in claim 4 includes the step of responsive to identifying said predefined dead device fault with said disk drive running and said transducer heads not being loaded, stopping said disk drive and returning said error code.

6. A method for implementing intelligent spin-up for a disk drive as recited in claim 4 wherein the step of checking whether said identified disk drive fault is said predefined dead device fault includes the step of comparing a unit error code of said identified disk drive fault with a plurality of predefined dead device (DD) unit error codes (UECs) to identify a match.

7. A method for implementing intelligent spin-up for a disk drive comprising the steps of:
receiving a command;
checking for a disk drive start command;
responsive to identifying said disk drive start command, checking a no-start flag;
responsive to identifying said no-start flag being set, returning an error code without starting said disk drive;
identifying a predefined dead device fault, setting said no-start flag, setting a no-load flag and storing said error code; and
responsive to receiving said command with said disk drive running and said transducer heads not being loaded, checking said no-load flag.

8. A method for implementing intelligent spin-up for a disk drive as recited in claim 7 includes the step responsive to identifying said no-load flag being set, stopping said disk drive and returning said error code.

9. Apparatus for implementing intelligent spin-up for a disk drive comprising:
a disk drive controller; said disk drive controller responsive to receiving a disk drive start command, for checking a no-start flag;
said disk drive controller responsive to identifying said no-start flag being set, for returning an error code without starting said disk drive;
said disk drive controller for starting said disk drive only responsive to said no-start flag not being set;
said disk drive controller for monitoring said disk drive to identify a predefined dead disk drive fault; and
said disk drive controller responsive to identifying a predefined dead disk drive fault, for setting said no-start flag, and for storing said error code.

10. Apparatus for implementing intelligent spin-up for a disk drive as recited in claim 9 wherein said disk drive controller responsive to identifying a predefined dead disk drive fault, for setting a no-load flag.

11. Apparatus for implementing intelligent spin-up for a disk drive comprising:
a disk drive controller; said disk drive controller responsive to receiving a disk drive start command, for checking a no-start flag;
said disk drive controller responsive to identifying said no-start flag being set, for returning an error code without starting said disk drive;
said disk drive controller for starting said disk drive only responsive to said no-start flag not being set; and
said disk drive controller responsive to identifying said no-load flag being set with said disk drive running and transducer heads not being loaded, for stopping said disk drive and returning said error code.

12. A computer program product for implementing intelligent spin-up for a disk drive, said computer program product including a plurality of computer executable instructions stored on a computer readable medium, wherein said instructions, when executed by a disk drive controller in the disk drive, cause the disk drive controller to perform the steps of:
receiving a command;
checking for a disk drive start command;
responsive to identifying said disk drive start command, checking a no-start flag;
responsive to identifying said no-start flag being set, returning an error code without starting said disk drive;

starting said disk drive only responsive to identifying said no-start flag not being set;

monitoring said disk drive to identify a predefined dead disk drive fault; and responsive to identifying a predefined dead disk drive fault, setting said no-start flag, and storing said error code.

13. A computer program product for implementing intelligent spin-up for a disk drive, said computer program product including a plurality of computer executable instructions stored on a computer readable medium, wherein said instructions, when executed by a disk drive controller in the disk drive, cause the disk drive controller to perform the steps of:

receiving a command;

checking for a disk drive start command;

responsive to identifying said disk drive start command, checking a no-start flag;

responsive to identifying said no-start flag being set, returning an error code without starting said disk drive;

starting said disk drive only responsive to identifying said no-start flag not being set;

receiving said command with said disk drive running and transducer heads in said disk drive not being loaded; and responsive to identifying said no-load flag being set, stopping said disk drive and returning said error code.

* * * * *